United States Patent Office 3,462,576
Patented Aug. 19, 1969

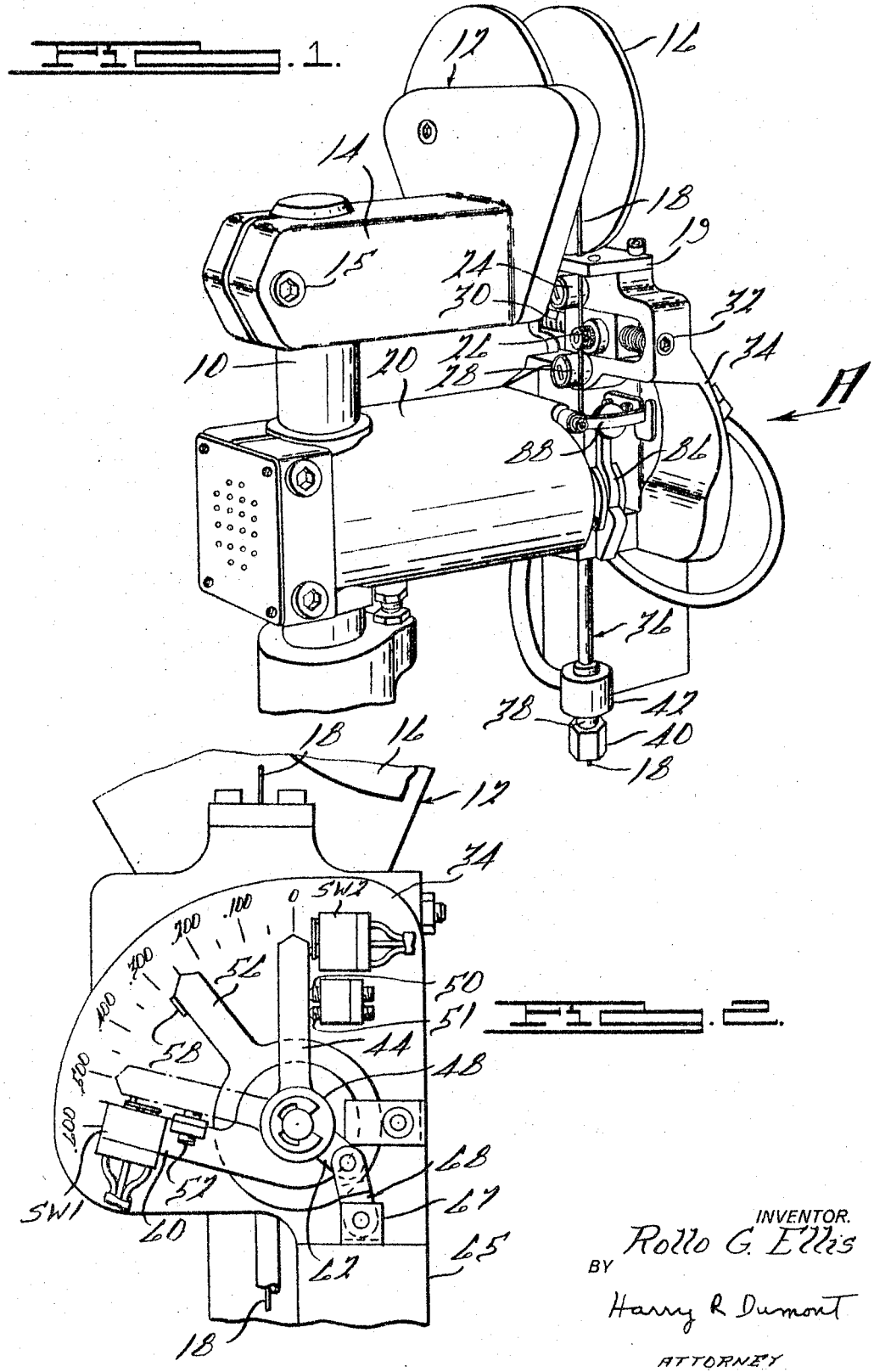

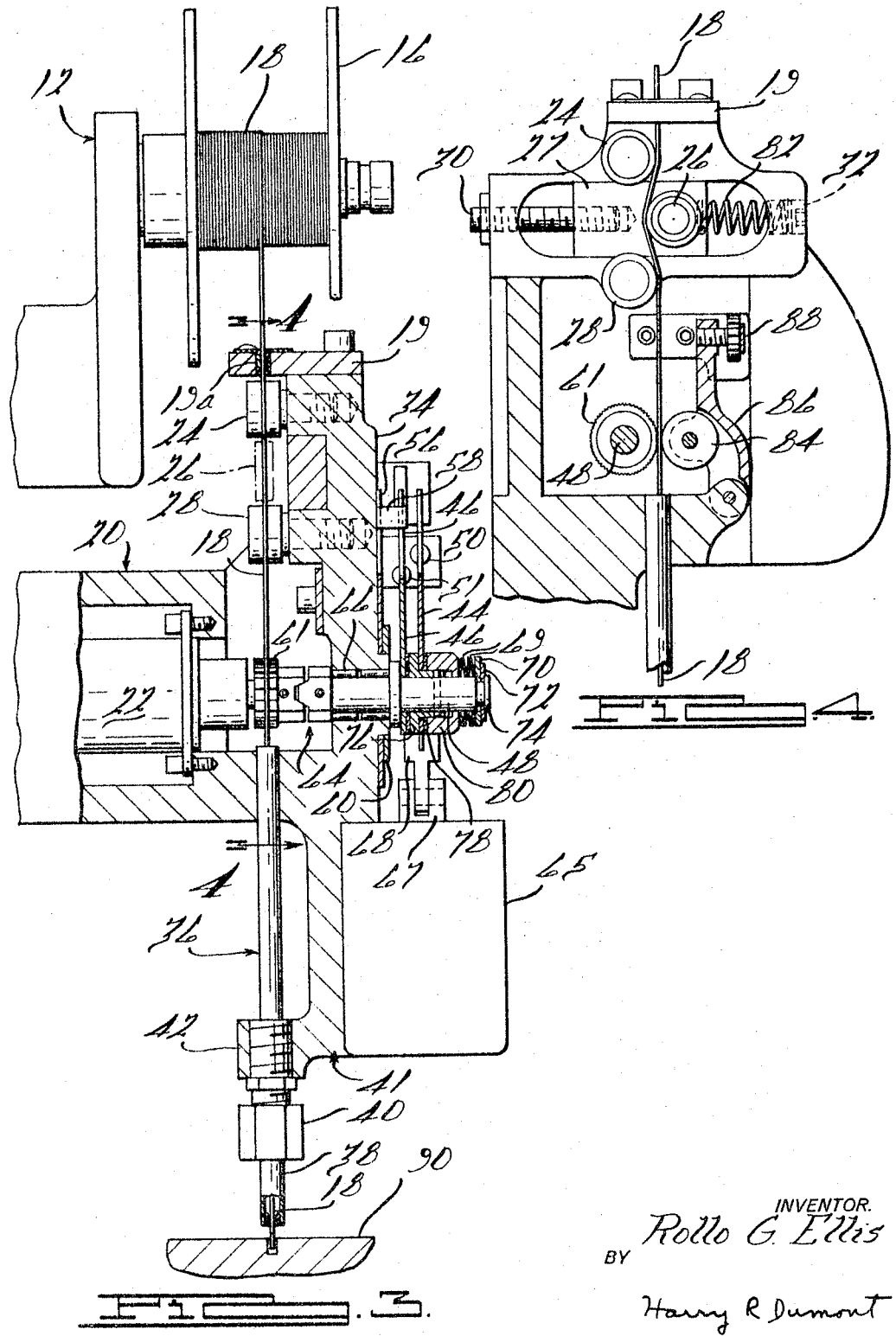

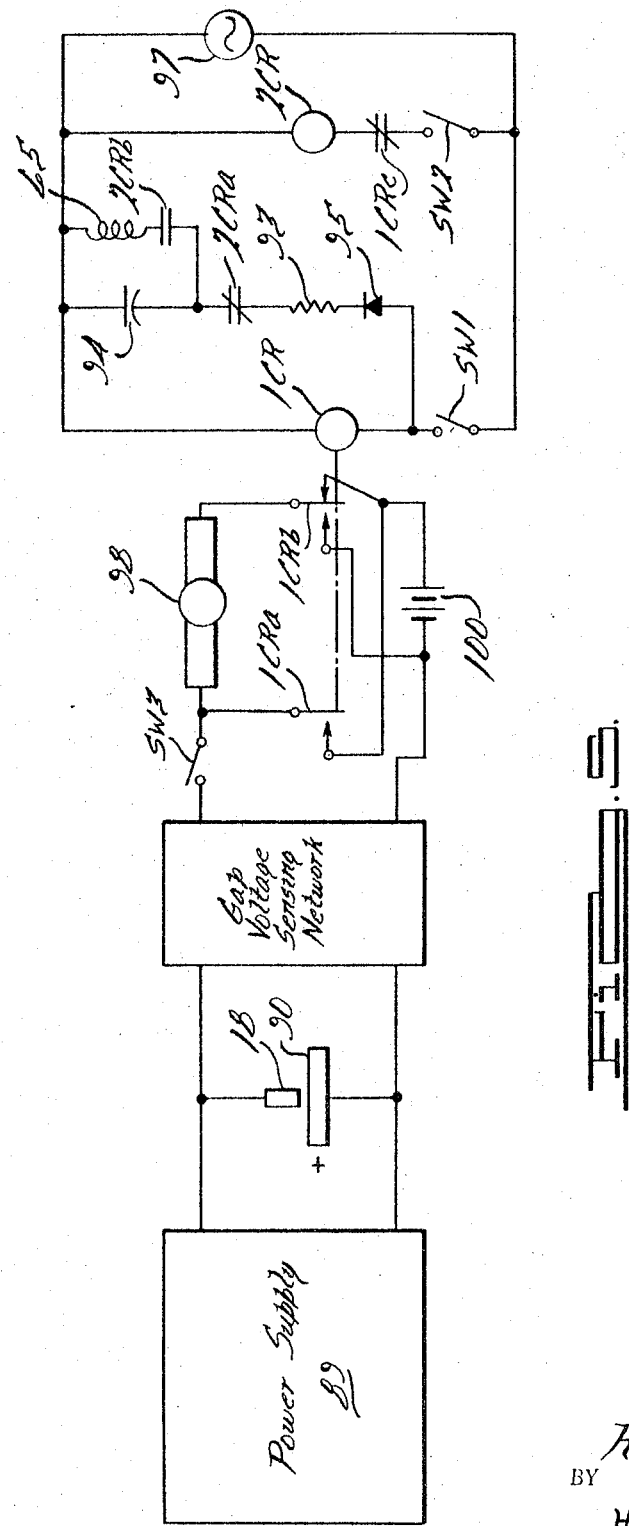

3,462,576
ELECTRODE FEED AND WEAR COMPENSATION MECHANISM FOR ELECTRICAL DISCHARGE MACHINING APPARATUS
Rollo G. Ellis, Birmingham, Mich., assignor, by mesne assignments, to Elox Inc., Troy, Mich., a corporation of Delaware
Filed June 3, 1966, Ser. No. 555,116
Int. Cl. B23k 9/16
U.S. Cl. 219—69          9 Claims

ABSTRACT OF THE DISCLOSURE

A servo feed system having a reversible drive means for moving a tool electrode in a forward direction during machining, a stop arm for presetting the estimated travel distance of the electrode to compensate for its wear during machining and a first and a second control lever. The first control lever is driven from its start position by the drive means in a forward direction with the electrode and, responsive to its engagement with the stop arm, is operable to reverse the direction of the drive means to withdraw the electrode. The second control means is yieldably driven by the drive means in its reverse direction and is operable to stop the reverse operation of the drive means and return the first control lever to its start position.

In electrical discharge machining, an electrical power supply is connected across a machining gap comprising a electrically conductive workpiece and a tool electrode. A flow of dielectric fluid is continuously maintained through the gap. The power supply provides electrical machining pulses across the gap to provide dielectric breakdown and gap discharge. In this manner, the workpiece is machined with a cavity produced in conformance with the shape of the tool electrode. A suitable servo feed system is employed to provide relative movement between electrode and workpiece at optimum gap spacing as machining progresses. During machining, material is removed from both electrode and workpiece with variable wear ratios, one relative to the other, depending on the material of the workpiece and electrode and other factors. Where the operation is of substantial depth, for example, in through-hole operations, it is important that sufficient electrode travel should be provided to insure machining to proper depth making due compensation for electrode wear.

It is an object of my invention to provide an electrode wear compensation mechanism for electrical discharge machining with means for presetting the travel of electrode relative to the depth of hole required to insure proper cutting to depth on repeat operations.

It is a further object of my invention to provide an electrode wear compensation mechanism wherein a visual indicator means is provided for making the necessary settings to provide for electrode wear during cutting.

My invention, together with its advantages, will be beter understood by reference to the accompanying drawings, in which:

FIGURE 1 is a perspective view of my electrode feed and wear compensation mechanism;

FIGURE 2 is an elevational view of the indicator and control portion of the apparatus of FIGURE 1 taken in the direction of arrow A;

FIGURE 3 is a partial cross sectional view of the apparatus of FIGURE 1 showing the detail of the drive and feed control mechanism;

FIGURE 4 is a sectional view along the line 4—4 of FIGURE 3; and

FIGURE 5 is a combined block diagrammatic and schematic drawing showing the operation of my invention.

With more detailed reference to the drawings, FIGURE 1 shows a vertical column 10 fixed to a base, not shown. Mounted at the upper end of column 10 is a vertical spool holder plate 12 which is fixed to column 10 by clamp 14 and fastener bolt 15. Spool holder plate 12 is both vertically and radially adjustable on column 10. A spool 16 carrying a wire electrode 18 is rotatably mounted on spool holder plate 12 to provide feed of the electrode in a downward direction as required. Also clamped to column 10 is a housing and drive assembly 20 which encloses a drive motor 22 for operating the electrode feed mechanism. Motor 22 and its associated drive apparatus are shown in detail in FIGURE 3 hereinafter. A guideway for the downward feed of electrode 18 is provided by apertured guide plate 19 and idler rolls 24, 26, 28. The aperture of plate 19 is provided with a Carboloy insert 19a as better shown in FIGURE 3, hereinafter. The tension applied by roll 26 against electrode 18 is laterally adjustable by means of screw 30. An indicator and control plate 34 is mounted at the forward end of housing 20. A lower guide tube assembly 36 extends downwardly and includes insulating tube 38, nut 40, and support sleeve 42. The lower end of electrode 18 is shown extending below nut 40. The negative terminal of the electrical power supply is normally connected to the electrode 18 by nut 40.

Reference is now made to FIGURES 2 and 3. A pair of indicator arms 44, 46 are journalled on drive shaft 48. Arm 46 is mounted directly rearwardly of arm 44 as is best seen in FIGURE 3. Adjustable upper limit stops 50 and 51 provided for arms 44 and 46, respectively. A stop switch SW2 is further mounted on plate 34 with its actuator operably engageable with the right-hand edge of arm 46 in its vertical position. A first limit arm 56 is mounted and radially positionable on plate 34 about shaft 48 as a center. Limit arm 56 carries a laterally extending lug 58 which lug is engageable with arm 46 to stop its leftward movement. A second limit arm 60 is similarly mounted and radially positionable about shaft 48 on plate 34. Arm 60 carries a lower limit stop 52 for the travel of arm 44. The lower limit stop 52 is in the form of an adjustable screw as shown. Also mounted on limit arm 60 is a motor reversing switch SW1 which has its actuator engageable with the left edge of arm 44. The lowermost position of arm 44 is indicated in phantom outline in FIGURE 2. It will further be seen that the arm 44 has a lower extending arm 62 to form a bell crank type lever pivotable about shaft 48. Arm 62 is connected to the plunger 67 of solenoid 65 through a link 68. Responsive to actuation of switch SW2 by lever 46, solenoid 65 is actuated to rock arm 44 rightwardly and to return it to its upper right-hand position against stop 50. The purpose and function of the above switches, limit arms, and indicator arms will be further explained in the section entitled "Description of Operation," hereinafter.

The manner of electrode drive is best seen from the showing of FIGURE 3. Electrode 18 is driven downwardly by the rotation of knurled drive roll 61. Roll 61 is fixed to the output or drive shaft 48 of motor 22. A backlash inhibiting linkage 64 is provided between the motor 22 and that portion of shaft 48 on which the indicator arms 44 and 46 are mounted. Shaft 48 extends through plate 34 and is journalled in bearing 66. Arms 44 and 46 are mounted on the outer portion of shaft 48 and maintained in frictional but yieldable driving arrangement, with it and one with the other. To this end, a plurality of resilient type washers 69 are maintained in engagement between a retaining cap 70, retaining clip 72, and an adjustable pressure knob 74. A pair of washers of frictional material 76, 78 are mounted intermediate arms 44, 46 and their mounting means as shown. Sleeve 80 is furthere pinned to shaft 48 as shown. FIGURE 3 further shows the lower portion of a support bracket 41 to which sleeve 42 is attached to provide rigid support to tube 38 and of electrode 18 which is passed therethrough.

FIGURE 4 illustrates further detail of the drive mechanism for electrode 18. Knurled drive roll 61 is indicated as mounted on shaft 48 and drive by motor 22. A pressure roll 84 is carried by a pivotable arm 86 which arm is selectively adjusted to bear against the electrode 18 as it passes between roll 84 and drive roll 61. Adjustment is obtained through a knurled adjusting knob 88. It will be further seen that upper knurled roll 26 is operably connected to a biasing spring 82. According to the setting of adjusting screw 32, roll 26 is biased into the direction toward the electrode 18 and in a direction toward rolls 24, 28. Roller 26 is rotatably mounted on an adjustable block 27. Block 27 is positionable laterally according to the adjustment of screw 30.

FIGURE 5 is a schematic which shows the electrical control system employed in conjunction with my electrode wear compensation system. A power supply 89 is indicated in block form which power supply may be an independent pulse generator type power supply such as that shown and described in U.S. Patent No. 3,229,159, entitled, "Superimposed High Striking Voltage Circuit," granted to Robert S. Webb on Jan. 11, 1966. The machining gap comprises the conductive workpiece 90 and electrode 18 with the normal polarity as shown having the workpiece 90 positive with reference to the electrode 18. The network for sensing gap voltage is used to control the operation of the power feed motor 22 in a manner which is well known in the art. It is the purpose of the electrode servo feed system to maintain an optimum gap spacing between electrode and workpiece as machining progresses. One example of a gap voltage sensing network operable in conjunction with an electrode power feed system is shown in U.S. Patent No. 3,230,412, entitled, "Servo Feed Apparatus for Electrical Discharge Machining," issued to Robert S. Webb, on Jan. 18, 1966. The armature of motor 22 is indicated by the numeral 98. It will be seen that a voltage representative of gap spacing is presented by the gap voltage sensing network at the left-hand terminal of armature 98. A DC reference voltage source is further shown by the numeral 100 which reference voltage is connectible to the right terminal of armature 98. The direction of current flow through armature 98 determines whether downfeed or upfeed of the electrode will be made relative to the workpiece. Switches SW1 and SW2 are connected in the circuit as shown. Switch SW1 is a switch which is actuated by arm 44 in its lowermost position. Switch SW1 serves to energize control relay 1CR which is effective through its movable contacts 1CRa and 1CRb to reverse the polarity across armature 98 and initiate a reverse direction operation of motor 22 to provide withdrawal of the electrode relative to the workpiece. Upon actuation of 1CR, capacitor 94 is charged through resistor 93 and diode 95. Switch SW2 is actuated by the return of arm 46 to its upper righthand position. It is the function of switch SW2 to disconnect the gap voltage network from armature 98 at the termination of the machining operation and to stop operation of the servo motor 22. This is accomplished by energizing relay 2CR to open the previously manually closed switch SW3. Switch SW2 has the additional function of energizing solenoid 65, to provide a backward or return movement of arm 44 at the termination of the machining cycle. This is accomplished by contacts 2CRa and 2CRb which permit the discharge of capacitor 94 through the control winding of solenoid 65. A suitable AC drive voltage source 97 is included for relays 1CR and 2CR as shown.

DESCRIPTION OF OPERATION

At the start of a machining operation, power supply 89 is connected across electrode 18 and workpiece 90 to furnish machining power pulses to the gap. Switch SW3 is manually closed to initiate the cycle of operation. Switch SW2 is in its normally open position. A gap voltage signal is provided at the left terminal of armature 98. A reference voltage signal is provided at the right terminal of armature 98 with current flow therethrough in a direction to initiate downfeed of electrode 18. In the event of momentary short circuit condition of the gap, the servo feed system as is well known in the art will provide a temporary backup operation of the electrode to clear the short circuit condition. Electrode downfeed drive is provided by drive roll 61 mounted on shaft 48 of motor 22. Limit arm 56 has been preset to determine the distance of travel of arm 46. This setting is made according to the depth of cut to be made. In the event a through hole is to be cut, the numerical scale would indicate the thickness of workpiece 90 plus an allowance for clearance. As an example, limit arm 56 is preset to provide for an electrode movement of .250 inch. Limit arm 60 has been set at .500 inch to provide for one to one wear ratio. As downfeed begins, indicator arms 44 and 46 begin their travel at the same time. Indicator arm 46 is driven downwardly until it is stopped by lug 58 on limit arm 56. Indicator arm 44 continues its travel until it abuts against stop 52 on limit arm 60 and activates switch SW1 which switch is also carried on limit arm 60. When switch SW1 is closed, it activates relay 1CR which reverses the polarity across armature 98 through its contacts 1CRa and 1CRb. This initiates backup of motor 22 and electrode withdrawal from the workpiece. As shaft 48 reverses its direction of rotation, both indicator arms 44 and 46 are driven upwardly toward their original vertical positions. Since indicator arm 46 has a lesser distance to travel, it will first return to its initial position to close switch SW2. The closure of SW2 will actuate relay 2CR to open the previously closed switch SW3 to interrupt the connection of the gap voltage to armature 98 and stop the drive of motor 22. At the same time, the normally open contacts 2CRb will be closed and contacts 2CRa will be opened. This will permit discharge of capacitor 94 through the control winding of solenoid 65. Solenoid 65 will thus be operated to return indicator arm 44 to its original position preparatory to another cycle of downfeed operation through switch SW3.

It will be seen that I have provided an improved electrode wear compensation device for electrical discharge machining which is readily adjustable with a high degree of accuracy to provide for electrode wear during cutting and to insure cutting to depth making due allowance for electrode wear.

I claim:

1. In an electrical discharge machining apparatus for machining a conductive workpiece by a tool electrode, an electrode wear compensating servo feed system comprising reversible drive means for moving said electrode in a forward direction toward said workpiece during machining, a stop means movable a predetermined distance from an initial position for presetting the distance of travel of said electrode to compensate for estimated electrode wear during machining and for electrode movement during machining, a first control means yieldably driven from a like initial position in said forward direction by said drive means in unison with said electrode and responsive to engagement with said stop means to reverse the direction of movement of said drive means to withdraw said electrode from said workpiece, and a second control means yieldably driven by said drive means in its reverse operation and operable to interrupt the operation of said drive means and to return said first control means to its initial position.

2. The combination as set forth in claim 1 wherein said drive means comprises an electrically operated motor having a control winding and wherein said first control means is operable to reverse the polarity across said control winding responsive to the engagement of said first control means and said stop means.

3. The combination as set forth in claim 1 wherein a switching means is mounted on said stop means, said switching means operatively connected to and controlling the operation of said motive means, said first control means operable to activate said switching means to reverse the operation of said drive means to provide electrode withdrawal.

4. The combination as set forth in claim 1 wherein both the aforesaid control means comprise levers operatively connected to and driven by said drive means.

5. The combination as set forth in claim 1 wherein a return solenoid is operatively connected to said first control means and actuable to return it to its initial position responsive to operation of said second control means.

6. In an electrical discharge machining apparatus for machining a conductive workpiece by a tool electrode, an electrode wear compensating servo feed system comprising a reversible drive means for moving said electrode toward said workpiece during machining, a control means movable by said drive means in unison with said electrode toward said workpiece, a stop means presettable to limit the movement of said control means a predetermined distance to provide for estimated electrode wear and electrode movement during machining, said control means engageable with said stop means and operable responsive to that engagement to reverse the operation of said drive means to withdraw said electrode from said workpiece, and means operatively connected to said drive means in its reverse operation for disabling it a predetermined time after the operation of said control means.

7. In an electrical discharge machining apparatus for machining a conductive workpiece by a tool electrode, an electrode wear compensation servo feed system comprising reversible drive means for moving said electrode in a forward direction from a initial position toward said workpiece during machining, a linear scale representative of the distance of movement of said electrode from its initial position, a first stop means manually settable in alignment with said scale at a first distance from said initial position to provide for electrode travel, a second stop means manually settable in alignment with said scale a second distance from said first stop means to provide for estimated electrode wear during machining, a first control means yieldably driven by said drive means from said initial position in unison with said electrode in said forward direction and engageable with said first stop means, a second control means yieldably driven by said drive means in unison with said electrode and engageable with said second stop means, said second control means operable response to its engagement with said second stop means to reverse the operation of said drive means to drive said first control means towards its aforesaid initial position, said first control means operable responsive to return to its initial position to interrupt the operation of said drive means.

8. In an electrical discharge machining apparatus for machining a conductive workpiece by a tool electrode, an electrode wear compensation servo feed system comprising reversible drive means for moving said electrode in a forward direction from an initial position toward said workpiece during machining, a linear scale representative of the distance of movement of said electrode from its initial position, a first stop means manually settable in alignment with said scale at a first distance from said initial position to provide for electrode travel, a second stop means manually settable in alignment with said scale a second distance from said first stop means to provide for estimated electrode wear during machining, a first control means yieldably driven by said drive means from said initial position in unison with said electrode in said forward direction and engageable with said first stop means, a second control means yieldably driven by said drive means in unison with said electrode and engageable with said second stop means, said second control means operable response to its engagement with said second stop means to reverse the operation of said drive means to withdraw said electrode from said workpiece and to drive said first control means toward its aforesaid initial position, said first control means operable responsive to return to its initial position to interrupt the operation of said drive means and operable to return said second control means to its initial position.

9. In an electrical discharge machining apparatus for machining a conductive workpiece by a tool electrode, an electrode wear compensating servo feed system comprising reversible electrically controlled drive means for moving said electrode from an initial position in a forward direction toward said workpiece during machining, a first switching means mounted a predetermined distance from said initial position to allow for estimated electrode wear and for electrode movement during machining, said first switching means operable to reverse the operation of said drive means to provide electrode withdrawal from said workpiece, a first control means operably connected to said drive means and driven in unison with said electrode, said first control means operable to actuate said first switching means, a second switching means mounted in said initial position, said second switching means actuable to interrupt the reverse operation of said drive means and to return said first control means to its initial position, and a second control means effective subsequent to the operation of said first control means to actuate said second switching means.

References Cited

UNITED STATES PATENTS 3,125,700   3/1964   Bentley et al.

JOSEPH V. TRUHE, Primary Examiner

R. F. STAUBLY, Assistant Examiner

PO-1050
(5/69)

UNITED STATES PATENT OFFICE
CERTIFICATE OF CORRECTION

Patent No. 3,462,576  Dated August 19, 1969

Inventor(s) Rollo G. Ellis

It is certified that error appears in the above-identified patent and that said Letters Patent are hereby corrected as shown below:

In the claims, Claim 7, Column 5, Line 55, following the words "of said drive means to", add --withdraw said electrode from said workpiece and to--.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents